US011875667B2

(12) United States Patent
Escofet Via et al.

(10) Patent No.: US 11,875,667 B2
(45) Date of Patent: Jan. 16, 2024

(54) FIRE SYSTEM WITH CURRENT RESPONSE CALIBRATION

(71) Applicant: Carrier Corporation, Palm Beach Gardens, FL (US)

(72) Inventors: Jordi Escofet Via, Barcelona (ES); Andres Cordoba Galera, Barcelona (ES); Santiago Vilarrubla Canals, Barcelona (ES); Ramon de la Torre, Barcelona (ES)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/712,712

(22) Filed: Apr. 4, 2022

(65) Prior Publication Data

US 2022/0319305 A1 Oct. 6, 2022

(30) Foreign Application Priority Data

Apr. 5, 2021 (EP) .................................... 21382280

(51) Int. Cl.
*G08B 29/20* (2006.01)
*G08B 17/00* (2006.01)

(52) U.S. Cl.
CPC ............. *G08B 29/20* (2013.01); *G08B 17/00* (2013.01)

(58) Field of Classification Search
CPC ................................ G08B 29/20; G08B 17/00
See application file for complete search history.

(56) References Cited

U.S. PATENT DOCUMENTS 4,388,616 A 6/1983 Machida
6,133,828 A 10/2000 Payne
(Continued)

FOREIGN PATENT DOCUMENTS

EP 0295593 A2 12/1988
EP 1296301 A2 3/2003
(Continued)

OTHER PUBLICATIONS

Author Unknown, “Intelligent Loop Isolator & Isolating Detector Bases: Product Data Sheet”, Axis, Advanced, date unknown, 2 Pages. https://www.advancedco.com/media/597587/Intelligent%20Loop%20Isolator%20&%20Isolating%20Base.pdf.
(Continued)

*Primary Examiner* — Curtis A Kuntz
*Assistant Examiner* — James E Munion
(74) *Attorney, Agent, or Firm* — CANTOR COLBURN LLP

(57) ABSTRACT

A fire system for a building is provided, the fire system including a fire panel for monitoring the building and activating an alarm; and a plurality of remote units electrically connected to the fire panel in a circuit having a loop configuration. At least some of the plurality of remote units including an indicating device for modulating a current in the circuit. The plurality of remote units are in communication with the fire panel in a master-slave relationship. The fire panel includes a calibration module for polling each indicating device to obtain a current response value and for storing said current response values, the current response value of an indicating device being based on the amplitude of the current when modulated by that indicating device.

15 Claims, 4 Drawing Sheets

(56) References Cited

U.S. PATENT DOCUMENTS

| | | | | |
|---|---|---|---|---|
| 7,046,013 | B2 | 5/2006 | Uematsu et al. | |
| 8,428,153 | B2 * | 4/2013 | Burns | H04B 14/02 375/242 |
| 8,804,291 | B2 | 8/2014 | Becker et al. | |
| 9,741,239 | B2 | 8/2017 | Okeefe et al. | |
| 10,832,557 | B2 | 11/2020 | Barson | |
| 2011/0150188 | A1 | 6/2011 | Buss | |
| 2017/0110003 | A1 | 4/2017 | Barson | |
| 2018/0342150 | A1 * | 11/2018 | Steffen | G08B 17/00 |
| 2020/0365010 | A1 | 11/2020 | Gouin | |

FOREIGN PATENT DOCUMENTS

| | | | |
|---|---|---|---|
| EP | 2348497 | B1 | 7/2013 |
| EP | 2706518 | A1 | 3/2014 |
| EP | 2747046 | A2 | 6/2014 |
| EP | 2804163 | A1 | 11/2014 |
| EP | 2911128 | A1 | 8/2015 |
| EP | 3156986 | A1 | 4/2017 |
| EP | 3361461 | A1 | 8/2018 |
| EP | 3441958 | A1 | 2/2019 |
| EP | 2625677 | B1 | 3/2019 |
| EP | 3745370 | A1 | 12/2020 |
| GB | 2451059 | A | 1/2009 |
| JP | 2002014721 | A * | 1/2002 |
| KR | 20210019297 | A * | 2/2021 |
| WO | WO1994003881 | A1 * | 2/1994 |
| WO | 2020165289 | A1 | 8/2020 |

OTHER PUBLICATIONS

Author Unknown, “Short-Circuit Isolation—In Addressable Fire Detection and Alarm Systems”, Apollo Fire Detectors Limited, Halma Company, Issue 15, 2015, 2 Pages. https://studylib.net/doc/18433916/short-circuit-isolation---apollo-fire-detectors-ltd.

European Search Report for Application No. 21382280.2; dated Sep. 17, 2021; 9 Pages.

* cited by examiner

FIRE SYSTEM WITH CURRENT RESPONSE CALIBRATION

FOREIGN PRIORITY

This application claims priority to European Patent Application No. 21382280.2, filed Apr. 5, 2021, and all the benefits accruing therefrom under 35 U.S.C. § 119, the contents of which in its entirety are herein incorporated by reference.

TECHNICAL FIELD OF INVENTION

The present invention relates to a fire system for a building, the fire system comprising: a fire panel for monitoring the building and activating an alarm; and a plurality of remote units electrically connected to the fire panel in a circuit having a loop configuration. The invention also relates to a method of operating such a fire system.

BACKGROUND OF THE INVENTION

Typically, there is a regulatory requirement in buildings to have a fire system in place. These fire systems are used to identify possible fires in the building and alert authorities and/or occupants of the building of the possible fire. In some instances, fire systems can also identify other types of emergency, such as other emergencies that require evacuation of the building. Typical fire systems employ a fire panel and a number of remote units, with some of the remote units comprising indicating devices (e.g. smoke alarms, manual call point, heat detectors, etc.) and/or indicator devices (e.g. sirens, bells, lights, etc.). The remote units are typically distributed across the building and are connected to the fire panel through a communications network. There may be additional devices in the fire system, such as fire extinguishing devices that can be automatically triggered via the fire panel. In some fire alarm systems, the remote units are electrically connected to the fire panel in a loop configuration, and communication between the remote units and fire panel is achieved by modulating the current and voltage in the loop. The fire panel may determine specific actions for different zones of a building depending on the nature and location of the emergency. For example, the fire panel may raise an alarm across the whole building, but only trigger the fire extinguishing devices in the zone of the building where a fire has been detected. The fire panel may be connected to a further communication network, such as a WiFi network or telephone network, for the purposes of alerting authorities to the emergency.

In known systems, the fire panel and the remote units communicate through a master-slave communication system. Such a configuration is often necessary due to regulatory requirements and/or to ensure compatibility with previously installed products that also employ a master-slave communication network. Thus, updated fire panels or remote units often must be able to carry out master-slave communications in order to operate correctly within pre-existing fire systems. The master-slave communications may involve the fire panel receiving an input from a remote unit in the form of a modulation in the current. This input may be translated into a current response value by the fire panel, and compared with a current threshold value to determine whether an alarm condition should be communicated to other remote units. However, the current response values of the remote units can differ across fire systems due to the installation of the fire system, the power consumption of the loop, the length of the loop, and so on. Further, the individual current responses of the remote units within the fire system may differ from one another depending on their position in the loop, or degradation over time. This can therefore lead to alarm conditions not being triggered if the system is not properly calibrated and an appropriate current threshold value is not chosen.

SUMMARY OF THE INVENTION

Viewed from a first aspect, the present invention provides a fire system for a building, the fire system comprising: a fire panel for monitoring the building and activating an alarm; and a plurality of remote units electrically connected to the fire panel in a circuit having a loop configuration, at least some of the plurality of remote units comprising an indicating device for modulating a current in the circuit; wherein the plurality of remote units are in communication with the fire panel in a master-slave relationship; and wherein the fire panel comprises a calibration module for polling each indicating device to obtain a current response value and for storing said current response values, the current response value of an indicating device being based on the amplitude of the current when modulated by that indicating device.

The fire system of the first aspect allows the fire panel to record a current response value for each indicating device, which advantageously allows for improved performance of the system, such as by use of a dynamic threshold for the current as discussed in relation to the examples below. In prior art systems, a constant current threshold value is defined, and if the fire panel detects a modulation in the current that passes this value, it will trigger an alarm condition. The current response values of the indicating devices will differ depending on the type of the indicating device and parameters of the fire system that they are used in. This is because the performance of the indicating devices is impacted by many factors, such as the installation of the device, the cable type of the loop, the length of the loop, and so on. The performance of the indicating devices may also degrade over time, and the individual performances of the indicating devices may differ depending on their position in the loop even if the devices are otherwise nominally identical. Prior art systems do not account for these differences in performance, nor do they account for the degradation of the fire system over time. The fire system of the first aspect however accounts for all of these factors, as the performance of the fire system can be monitored by periodically recording the individual current response value of each indicating device. A more robust and adaptable fire system is therefore provided by the present invention. As a result of this improvement in robustness and adaptability, the fire system of the first aspect may not face the same limitations as those faced by conventional fire systems. For example, the fire system of the present invention can have a higher maximum number of remote units and a larger distance between the remote units and the fire panel than conventional fire systems, as well as a longer overall operating life.

The fire panel may comprise a loop controller, which may be for controlling the operation of the loop. The loop controller may be a part of a fire panel control system that also has overall control of the fire panel and its functions, or it may be a separate hardware or software element compared to such a control system. The loop controller may be a central processing unit (CPU). The loop controller may be configured to determine a response to the communications from the remote units. For example, in response to information from one of the remote units, the loop controller may be configured to determine that all or some of the remote units should enter an alarm condition. The loop controller may be configured to determine that only the remote units in the same zone as the emergency should enter an alarm condition, and/or that some remote units should enter an alarm condition at different times than others. This may aid efficient evacuation of the building in the event of an emergency.

The loop controller may comprise the calibration module. Additionally or alternatively, the loop controller may be configured to process (e.g. to measure and/or record) any modulations in the current for the calibration module, which may be a separate hardware and/or software element to the loop controller. This may include determining the amplitude of the modulation in current and/or determining the current response value of the relevant indicating device based on the amplitude of the modulation in current.

The fire panel may comprise a memory device for storing the current response values. The memory device may be added to the fire panel as a hardware element, and/or may be added as part of the loop controller and/or the calibration module. In some cases, the memory device may be provided in a modification of a known fire panel by use of a pre-existing memory device of the fire panel. The memory device may be, for example, a loop card. The loop card may have memory storage capabilities alongside current detection and/or data transmission capabilities, and may be positioned between the loop controller and the loop. The loop card may additionally or alternatively be positioned between the calibration module and the loop. The loop card may be configured to communicate information from the loop to the loop controller and/or calibration module, which may then be processed by the loop controller and/or calibration module in order to determine a response. The loop card may be configured to receive information from the loop controller and/or calibration module and communicate that information to the remote units. The loop card may comprise LEDs for indicating a basic status of the loop, for example a fault or alarm condition.

The possible emergency may be related to a fire, for example, but it will be appreciated that the fire system may also be used for also other emergencies, such as non-fire emergencies requiring activation of an evacuation procedure.

The remote units are electrically connected in a loop configuration, and may have connecting wiring starting and finishing at the fire panel. The fire panel may be configured to monitor alarm conditions and possible emergencies in the building based on signals received from at least some of the remote units, and may be configured to trigger an alarm condition in at least some of the remote units in response. The fire panel may be configured to monitor the voltage and/or current in the circuit in order to detect any signals from the remote units, and may comprise means for altering the voltage and/or current in the circuit in order to trigger an alarm condition throughout the loop. The fire panel may be further configured to monitor faults in the circuit, such as short circuits and/or line breaks.

The remote units communicate with the fire panel through a master-slave communication system. The master-slave communication system may be a wired network with wired connections between the fire panel and each of the remote units. The fire panel may be configured to send commands to the remote units through the master-slave communication system. The fire panel may be configured to modulate the voltage in the loop to communicate these commands to the remote units. The modulation of the voltage may be an increase or decrease in voltage, and/or may be a voltage pulse. The remote units may comprise a voltage sensor for detecting these modulations in the voltage. The command may be a signal polling the remote units for their status information, and/or may be a signal commanding the remote units to enter an alarm condition. The indicating devices may be configured to respond to the command by modulating the current in the loop. The modulation of the current may be an increase or decrease in current, and/or may be a current pulse.

The fire panel may be configured to periodically poll at least some of the remote units to monitor their status during normal operation of the fire system. The fire panel may be configured to poll each remote unit individually, and/or may be configured to poll groups of remote units at the same time. Polling groups of remote units at the same time may shorten the amount of time needed to poll the whole loop. The polled remote unit(s) may be configured to respond with a signal giving the status of the remote unit(s). The response signal may further comprise other information, such as the address or manufacturer code of the remote unit(s). As a result of this polling, the fire panel may be able to detect an approaching alarm condition and may take action accordingly.

The fire panel may comprise means for communicating a fire alarm condition or a fault status to an operator and/or occupant of the building. These means may comprise a display and/or LED lights. For example, the fire panel may display one form of visual feedback (e.g. lighting up one LED light) when a fire alarm condition is detected, and display one form of visual feedback (e.g. lighting up a different LED light) when a fault in the circuit is detected. Additionally or alternatively, the fire panel display may show information pertaining to the detected fire alarm condition or fault. This information may inform an operator and/or occupant of the building of the source of the alarm condition or fault, and may comprise the address of the relevant remote unit and the zone in which it is located. A user may be able to view the stored current response values through the fire panel display.

In a standby condition, the remote units may be configured to draw a low current. The current in the standby condition may be less than 100 μA. If a remote unit comprises an indicating device, the remote unit is configured to modulate a current in the loop. This may be done in response to the indicating device detecting a condition indicative of a possible emergency, or it may be done in response to a command received from the fire panel. The fire panel may be configured to detect this modulation in the current and, if the modulation in the current is indicative of a possible emergency, communicate a fire alarm condition to some or all of the remaining remote units. The current response value of an indicating device is based on the amplitude of the current when modulated by said indicating device, wherein the current may be the current as detected by the fire panel. The modulation in current detected by the fire panel may differ from the modulation in current caused by the indicating device. For example, the amplitude of the current detected by the fire panel may be smaller than that modulated by the indicating device, due to the amplitude decreasing as it travels through the loop (e.g. due to inefficiencies in the loop), or past other remote units (e.g. due to their individual current consumptions). The current response value may therefore be based on the modulation in current as detected by the fire panel.

The modulation of the current may be considered to be indicative of a possible emergency if its current response value passes a current threshold value. The modulation of the current may be considered to be indicative of a possible emergency if it exceeds or falls below the current threshold value. In prior art systems, this current threshold value may be chosen based on the specifications of the fire system, such as the model of the remote units or fire panel used, and may be kept constant. However, it will be appreciated that the current response value of an indicating device depends on many factors, including its position within the loop, its age, its installation, and so on. Further, the current response values of all the indicating devices may be impacted by the installation of the fire system, the loop length, the wire material, the power consumption of the fire system, and so on. Thus, current threshold values that are kept constant and are determined based on the specifications of the fire system alone may not always be appropriate.

The fire system may be configured to enter a maintenance mode and/or a calibration mode of operation. In the maintenance mode of operation, the calibration module may be configured to measure each current response value, issue any warnings, and/or produce a maintenance report, whereas in the calibration mode of operation, the calibration module may be configured to measure and store each current response value, issue any warnings, and/or re-determine a current threshold value of the system, as will be explained in further detail below. The maintenance mode of operation may be used to determine whether the fire system should enter the calibration mode of operation. Hence, the maintenance mode of operation may be used to carry out general maintenance checks of the fire system and may not result in any changes to the fire system. In contrast, the calibration mode of operation may be used to re-calibrate the system in order to account for any changes made to the system or faults identified during the maintenance mode.

The fire system may be configured to enter the maintenance mode and/or the calibration mode in response to an operator triggering the maintenance and/or calibration mode. The calibration mode may be triggered through the fire panel, for example through a button and/or an option presented on the fire panel display. Additionally or alternatively, the fire system may be configured to enter the maintenance mode automatically. In this case, the calibration module or another control component of the fire system (e.g. within the fire panel) may be configured to automatically trigger the fire system to enter the maintenance mode. This may occur in response to a change in the fire system, for example the addition or removal of a remote unit, maintenance repairs to the system, and so on. These changes may be automatically detected by the fire panel, for example so that the fire panel may automatically trigger the maintenance mode.

The fire system may be configured to periodically enter the maintenance mode as part of a maintenance routine, for example on a yearly, monthly, or weekly basis. The calibration module may be configured to monitor the time and automatically trigger the maintenance mode at the designated intervals. Additionally or alternatively, the maintenance mode may be triggered by an operator at the designated time.

In response to entering the calibration mode or the maintenance mode of operation, the calibration module may be configured to poll each indicating device sequentially. The order of polling may be determined by the position of the indicating device in the loop. For example, the indicating device closest to the fire panel along the loop may be polled first, and the indicating device furthest from fire panel along the loop may be polled last, or vice versa.

The calibration module may be configured to poll the indicating devices by transmitting a polling signal through the loop. The polling signal may be a modulation of the voltage in the loop, and may be an increase or decrease in voltage, and/or a voltage pulse. The fire panel may be configured to modulate the voltage in the loop differently for each signal it sends out; for example, the modulation in the voltage caused by polling signals may differ from that caused by signals indicating an alarm condition. The polling signal may be encoded with an address of an indicating device, which may be used to communicate which indicating device the polling signal is intended for. The indicating devices may comprise a transceiver for decoding signals received from the fire panel. Therefore, the transceiver of an indicating device may be configured to decode the address of any polling signals it receives and determine whether it is the indicating device that the polling signal is intended for.

If an indicating device determines that it is the device the polling signal is intended for, then it may be configured to respond by modulating a current in the loop. This modulation in the current may be equivalent to that transmitted by the indicating device when it detects a condition indicative of a possible emergency. The fire panel may be configured to detect this modulation in the current and determine its amplitude by using the calibration module and/or the loop controller. The loop card may be configured to detect the modulation in the current and communicate the modulation in current through the loop card to the loop controller and/or calibration module. Alternatively, the loop controller and/or calibration module may be configured to detect the modulation in current directly. The loop controller and/or the calibration module may be configured to determine the amplitude of the modulation in the current. The loop controller and/or the calibration module may be configured to determine the current response value based on the amplitude of the modulation in the current. The calibration module may therefore be configured to determine current response value directly, or the loop controller may be configured to determine the current response value and communicate the current response value to the calibration module. The calibration module may be configured to store the current response value. For example the current response value may be stored in the memory device as discussed above. The current response values may be stored only during the calibration mode of operation. The calibration module may be configured to repeat this process for each indicating device in the loop, until the current response value of every indicating device is measured and, if in the calibration mode, stored.

The indicating devices may be configured to modulate the current in both directions through the loop. During normal operation of the fire system, the indicating devices may be configured to modulate the current in a first direction through the loop. During normal operation, the fire panel may be configured to transmit signals to the remote units through a second direction through the loop, wherein the second direction may be opposite to the first direction. The fire panel may also be configured to supply power to the remote units through the second direction in the loop during normal operation. However, if a break in the loop occurs, the direction in which the remote units and fire panel communicate, and the direction in which the fire panel supplies power to the loop, may change based on where the break in the loop is located. For example, any remote devices forward of the break (i.e. located along the first direction from the break) may be configured to continue modulating the current in the first direction in the loop, and may continue receiving power and/or communications from the fire panel along the second direction in the loop. However, any remote devices behind the break (i.e. located along the second direction from the break) may be configured to start modulating the current in the second direction along the loop, and may begin receiving power and/or communications from the fire panel along the first direction along the loop. That is, the fire panel may be configured to transmit power and/or communications along the first direction in the loop to any remote devices located behind the break, and may be configured to transmit power and/or communications along the second direction in the loop to any remote devices located ahead of the break. When a break occurs, the remote units located behind the break will be unable to receive or send communications to the fire panel through their usual direction of communication. The location of the break may be therefore be determined by the fire panel detecting that it is not receiving responses from certain remote units in the loop. In response, the fire panel may be configured to reverse the direction in which it communicates and/or supplies power to the remote units located behind the break, and may be configured to command the indicating devices located behind the break to reverse the direction in which they modulate the current. Alternatively, the indicating devices located behind the break may be configured to reverse the direction in which they modulate the current without any instruction from the fire panel, as they may themselves be configured to detect that they have stopped receiving power and/or communications from the fire panel and, in response, determine that they are behind a break and thus must reverse their communication direction. In this case, the fire panel may be configured to determine the location of the break based on the direction of communication from each indicating device.

As mentioned above, the performance of an indicating device may depend on its position in the loop relative to the fire panel. That is, the current response value of an indicating device may be affected by the distance that the current has had to travel through the loop to reach the fire panel. Therefore, if the direction of communication in some indicating devices is reversed, the current response values of those indicating devices may change. It may therefore be advantageous to measure and store the current response values of each indicating device in both directions along the loop. Therefore, in the maintenance and/or calibration mode, the indicating devices may be configured to respond to polling signals by modulating the current in the first direction along the loop and/or in the second direction along the loop. The calibration module may be configured to transmit a first polling signal that requests the current response value of an indicating device in the first direction, and a second polling signal that requests the current response value of an indicating device in the second direction. Alternatively, the calibration module may be configured to transmit a single polling signal that requests the current response values of an indicating device in both directions. In response to this polling signal, the indicating device may be configured to first modulate the current along the first direction, and then modulate the current along the second direction, or vice versa. Alternatively, the indicating device may be configured to modulate the current along the loop in both directions simultaneously. The current response value of an indicating device in the first direction may be known as its first current response value, and the current response value of an indicating device in the second direction may be known as its second current response value. In the calibration mode, the calibration module may be configured to store both the first and second current response values of each indicating device, for example at a memory device as described above.

The calibration module may be configured to compare each current response value to the current threshold value, and may be configured to indicate a warning if a current response value is within a predetermined margin from the current threshold value. The calibration module may be configured to label any current response values that are within a predetermined margin from the current threshold value as warning values. The warning may be indicated as a warning notification and may be communicated through a form of visual feedback, such as LED lights and/or the fire panel display. Additionally or alternatively, the fire panel may comprise one or more transmitter devices for communicating the warning to users, for example via wireless transmission of the warning notification to a mobile device. The warning notification may include information regarding the indicating device that caused the warning value, such as its address and location. The fire panel may be configured to communicate the warning to the indicating device responsible for the warning value, which may cause the indicating device to enter a warning condition. The indicating device may comprise an indicator, such as a visual and/or audible indicator, and may be configured to communicate a warning condition to a user through the indicator. The calibration module may be configured to indicate warnings in the maintenance mode and/or the calibration mode.

The calibration module may be configured to produce a maintenance report each time the fire system enters the maintenance mode. The maintenance report may contain information such as the stored current response values of each indicating device, the measured current response values of each indicating device, a difference between the measured and the stored current response values of each indicating device, and which of the measured current response values have been identified as warning values. The calibration module may be configured to communicate the maintenance report to the loop controller, and the loop controller may be configured to communicate the maintenance report to a transmitter device of the fire panel. Alternatively, the calibration module may be configured to communicate the maintenance report to the transmitter device directly. The transmitter device may be configured to transmit the maintenance report to a user, for example via wireless transmission of the maintenance report to a mobile device. Additionally or alternatively, the fire panel may be configured to display the maintenance report on the fire panel display. The fire system may therefore be considered to provide 'smart' notifications in the form of this maintenance report to a user during the maintenance mode. These 'smart' notifications may aid a user during maintenance visits, for example by clearly showing any changes and/or potential faults in the system. The 'smart' notifications may therefore allow improved overall maintenance of the fire system.

Through the warning and/or the maintenance report, users may be able to identify when the performance of an indicating device and/or the performance of the overall loop has degraded to the point where it may cause faults in the fire system. If the current response value of an indicating device falls below the current threshold value, then it will no longer be able to communicate an alarm condition to the fire panel when it detects conditions that are indicative of a possible emergency. In order to properly identify and rectify faults, it is therefore important for a user to be able to identify which current response values of the indicating devices are approaching, or have passed, this current threshold value.

By measuring the current response values of the indicating devices and producing a maintenance report each time the fire system enters the maintenance mode, any faults across the loop may be easily identified. Further, any degradations in performance over time due to aging may be observed and remedied by a user prior to a fault occurring.

A user may be able to determine what kind of fault has occurred, or is about to occur, based on the warning and/or maintenance report. For example, if a user identifies only a single fault across the loop in an aged indicating device, then they may be able to determine that the fault has been caused solely by the aging of that device. Alternatively, if a user identifies faults in all the indicating devices, it may be indicative of a problem across the whole loop.

Thus, after the fire system has entered the maintenance mode and a maintenance report has been produced, a user may determine, based on the maintenance report, that the fire system should enter a calibration mode, wherein updated current response values are stored and/or a new current threshold value is set. The fire system may be configured to enter the calibration mode in response to an input by a user, for example through a button and/or an option presented on the fire panel display.

The calibration module may be configured to adjust the current threshold value based on the current response values. The calibration module may be configured to only adjust the current threshold value if instructed to by a user, for example in reaction to triggering of the calibration mode. As mentioned above, the user may determine from the maintenance report and/or any warnings indicated by the fire panel during the maintenance mode that the current threshold value should be adjusted. For example, the user may determine that the current threshold value should be adjusted in response to observing that at least one current response value is within a predetermined margin from the previous current threshold value, and/or in response to observing that at least one current response value is labelled as a warning value. Upon this determination, the user may trigger the calibration mode in the fire system, which may in turn trigger the adjustment of the current threshold value. The calibration module may be configured to determine a new current threshold value based on the smallest current response value. The new current threshold value may be determined to be equal to the lowest current response value plus or minus a predetermined error threshold. Thus, the current threshold value may be adjusted to account for any degradations in performance in the indicating devices or fire system.

The fire system may comprise a plurality of isolators for dividing the loop into multiple, electrically isolatable segments. An isolator may be placed between each remote unit. Additionally or alternatively, isolators may be embedded within some or all of the remote units. Thus, the plurality of isolators may be used to electrically isolate at least some of the remote units from the rest of the circuit. The plurality of isolators may also be used to isolate any short-circuits in the loop. The plurality of isolators may comprise an indicator, such as an LED, for indicating that the isolator has been activated.

In the maintenance mode and/or the calibration mode of operation, an operator may activate at least some of the plurality of isolators. Alternatively, the fire system may be configured to automatically activate the isolators in response the fire system entering the maintenance and/or calibration mode, for example by the loop controller and/or the calibration module. The fire system may be configured to activate the isolators in such a way that a single indicating device is left electrically connected to the fire panel in the loop, with all the remaining remote units electrically isolated from the fire panel. The loop controller and/or the calibration module may be configured to determine which isolators should be activated. Thus, noise from the remote units may be reduced in the calibration mode when isolators are employed.

However, during normal operation of the fire system, the isolators are not employed and all of the remote units are electrically connected to the fire panel. Therefore, the current response value of each indicating device will be impacted by the number of remote units ahead of said indicating device, i.e. the number of remote units located between said indicating device and the fire panel in the direction of travel of the modulation in current. Hence, when isolators are employed, the calibration module may be configured to subtract the current consumption of each remote unit ahead of an indicating device from the detected modulation in current transmitted by that device in order to determine its current response value. The current consumption of each remote unit may be stored at the fire panel, such as in the loop card, and may be known from the specifications of the remote units.

The calibration of the fire system may be initially carried out when the fire system is first installed. That is, the fire system may be configured to enter the calibration mode of operation when it is first installed, and the current threshold value and individual current response values of the indicating devices may be determined and stored during this initial calibration. The fire system may then be configured to enter the maintenance mode periodically afterwards, and/or when changes are made to the fire system. Based on the results of the maintenance mode, the fire system may then be configured to enter the calibration mode again if desired by a user, as described above.

The fire panel may be configured to use the current response values to determine which indicating device a detected modulation in current has originated from. Additionally or alternatively, the fire panel may be configured to use the current response values to determine if a detected modulation in current has originated from multiple indicating devices, or from a single indicating device transmitting multiple responses. This may be possible due to at least some of the indicating devices having different current response values. Thus, the current response value of an indicating device may be characteristic of that particular indicating device, and may be used for identification purposes.

The indicating devices may be devices for sensing conditions or for receiving inputs from users. For example the indicating device may include one or more of: manual call points; smoke detectors; heat detectors; other building sensors used for fire or heat detection, such as room thermostats; sensors for supervised doors; sensors for supervised fire extinguishers; water flow sensors; and so on. Input-output modules may be provided for handling information from some types of sensors that may lie outside of the fire system, such as thermostats or water flow sensors. Additionally or alternatively, input-output modules may be provided for activating fire extinguishers, fire sprinklers, automatic door opening and/or closure systems, or door locking systems. The indicating device may provide inputs for triggering an alarm condition of the fire system.

At least one of the remote units may comprise an indicator device, which may be a device for indicating an alarm condition of the fire system, such as audible or visible devices. The indicator device may include one or more of:

sirens; bells; speech sounders; other types of sounders; lights; beacons or remote indicators. The indicator device may also include one or more transmitter devices for sending alarm notifications to users. Alarm notifications may be sent to local users, for example via wireless transmission of notifications to a mobile device, and/or may be sent to remote users such as building management authorities and/or emergency services.

At least one of the remote units may comprise a combined indicating and indicator device, for example a device including detection capabilities along with an alarm, such as smoke detectors also including an audible alarm. Such a remote unit may include combinations of any of the functions discussed above in relation to the indicating and indicator devices.

The invention extends to a building incorporating the fire system, wherein the plurality of remote units may be distributed within the building.

Viewed from a second aspect, the invention provides a method of operating a fire system as in the first aspect, wherein the method comprises polling each indicating device for its current response value then reporting said current response values to a user and/or storing said current response values.

The method may include operating a fire system with any of the other features discussed above.

The fire panel may comprise a loop controller, and the method may include using the loop controller to control the operation of the loop. The method may include using the loop controller to determine a response to the communications from the remote units. For example, in response to information from one of the remote units, the loop controller may determine that all or some of the remote units should enter an alarm condition. The method may include using the loop controller to determine that only the remote units in the same zone as the emergency should enter an alarm condition, and/or that some remote units should enter an alarm condition at different times than others. This may aid efficient evacuation of the building in the event of an emergency.

The method may include using the loop controller to process (e.g. to measure and/or record) any modulations in the current for the calibration module, which may be a separate hardware and/or software element to the loop controller. This may include determining the amplitude of the modulation in current and/or determining the current response value of the relevant indicating device based on the amplitude of the modulation in current.

The method may include using a memory device to store the current response values. The memory device may be, for example, a loop card. The method may include using the loop card for memory storage alongside current detection and/or data transmission. The method may include using the loop card to communicate information from the loop to the loop controller and/or calibration module. The method may further include processing this information using the loop controller and/or calibration module in order to determine a response. The method may include using the loop card to receive information from the loop controller and/or calibration module and communicate that information to the remote units.

The possible emergency may be related to a fire, for example, but it will be appreciated that the fire system may also be used for also other emergencies, such as non-fire emergencies requiring activation of an evacuation procedure.

The method may include using the fire panel to monitor alarm conditions and possible emergencies in the building based on signals received from at least some of the remote units, and to trigger an alarm condition in at least some of the remote units in response. The method may include using the fire panel to monitor the voltage and/or current in the circuit in order to detect any signals from the remote units, and/or using the fire panel to alter the voltage and/or current in the circuit in order to trigger an alarm condition throughout the loop. The method may include using the fire panel to monitor faults in the circuit, such as short circuits and/or line breaks.

The remote units communicate with the fire panel through a master-slave communication system. The master-slave communication system may be a wired network with wired connections between the fire panel and each of the remote units. The method may include using the fire panel to send commands to the remote units through the master-slave communication system. The method may include using the fire panel to modulate the voltage in the loop in order to communicate these commands to the remote units. The modulation of the voltage may be an increase or decrease in voltage, and/or may be a voltage pulse. The remote units may comprise a voltage sensor for detecting these modulations in the voltage. The command may be a signal polling the remote units for their status information, and/or may be a signal commanding the remote units to enter an alarm condition. The indicating devices may respond to the command by modulating the current in the loop. The modulation of the current may be an increase or decrease in current, and/or may be a current pulse.

The method may include using the fire panel to periodically poll at least some of the remote units to monitor their status during normal operation of the fire system. The method may include using the fire panel to poll each remote unit individually, and/or poll groups of remote units at the same time. Polling groups of remote units at the same time may shorten the amount of time needed to poll the whole loop. The polled remote unit(s) may respond with a signal giving the status of the remote unit(s). The response signal may further comprise other information, such as the address or manufacturer code of the remote unit(s). As a result of this polling, the fire panel may be able to detect an approaching alarm condition and may take action accordingly.

The method may include using the fire panel to communicate a fire alarm condition or a fault status to an operator and/or occupant of the building, for example through a display and/or LED lights. The method may include displaying one form of visual feedback (e.g. lighting up one LED light) when a fire alarm condition is detected, and displaying one form of visual feedback (e.g. lighting up a different LED light) when a fault in the circuit is detected. Additionally or alternatively, the method may include using the fire panel display to show information pertaining to the detected fire alarm condition or fault. This information may inform an operator and/or occupant of the building of the source of the alarm condition or fault, and may comprise the address of the relevant remote unit and the zone in which it is located. A user may be able to view the stored current response values through the fire panel display.

In a standby condition, the remote units may draw a low current. The current in the standby condition may be less than 100 μA. If a remote unit comprises an indicating device, the remote unit may modulate a current in the loop. This may be done in response to the indicating device detecting a condition indicative of a possible emergency, or it may be done in response to a command received from the fire panel.

The method may include using the fire panel to detect this modulation in the current and, if the modulation in the current is indicative of a possible emergency, communicate a fire alarm condition to some or all of the remaining remote units. The method includes determining a current response value of an indicating device based on the amplitude of the current when modulated by said indicating device, wherein the current may be the current as detected by the fire panel. The modulation in current detected by the fire panel may differ from the modulation in current caused by the indicating device. For example, the amplitude of the current detected by the fire panel may be smaller than that modulated by the indicating device, due to the amplitude decreasing as it travels through the loop (e.g. due to inefficiencies in the loop), or past other remote units (e.g. due to their individual current consumptions). The method may therefore include determining the current response value based on the modulation in current as detected by the fire panel.

The method may include determining that a modulation of the current is indicative of a possible emergency if its current response value passes a current threshold value. The method may include determining that the modulation of the current is indicative of a possible emergency if it exceeds or falls below the current threshold value. In prior art systems, this current threshold value may be chosen based on the specifications of the fire system, such as the model of the remote units or fire panel used, and may be kept constant. However, it will be appreciated that the current response value of an indicating device depends on many factors, including its position within the loop, its age, its installation, and so on. Further, the current response values of all the indicating devices may be impacted by the installation of the fire system, the loop length, the wire material, the power consumption of the fire system, and so on. Thus, current threshold values that are kept constant and are determined based on the specifications of the fire system alone may not always be appropriate.

The method may include triggering a maintenance mode and/or a calibration mode of operation in response to the actions of an operator. The method may include measuring each current response value, issuing warning(s), and/or producing a maintenance report in the maintenance mode. The method may include measuring and storing each current response value, issuing warning(s), and/or determining a new current threshold value in the calibration mode. The method may include using the results from the maintenance mode to determine whether the fire system should enter the calibration mode. Hence, general maintenance checks may be carried out during the maintenance mode, but no changes may be made to the system. In contrast, the system may be re-calibrated in the calibration mode to account for any changes made to the system or faults identified during the maintenance mode.

The method may include using the fire panel to trigger the maintenance mode and/or the calibration mode, for example through a button and/or an option presented on the fire panel display. Additionally or alternatively, the method may include automatically triggering the maintenance mode. In this case, the method may include using the calibration module or another control component of the fire system (e.g. within the fire panel) to automatically trigger the fire system to enter the maintenance mode. This may occur in response to a change in the fire system, for example the addition or removal of a remote unit, maintenance repairs to the system, and so on. These changes may be automatically detected by the fire panel, for example so that the fire panel may automatically trigger the maintenance mode.

The method may include triggering a maintenance mode of operation in the fire system periodically as part of a maintenance routine, for example on a yearly, monthly, or weekly basis. The method may include using the calibration module to monitor the time and automatically trigger the maintenance mode at the designated intervals. Additionally or alternatively, the method may include triggering the maintenance mode in response to the actions of an operator at the designated time.

In response to entering the maintenance mode and/or the calibration mode of operation, the method may include using the calibration module to poll each indicating device sequentially. The method may include determining an order of polling based on the position of the indicating device in the loop. For example, the indicating device closest to the fire panel along the loop may be polled first, and the indicating device furthest from fire panel along the loop may be polled last, or vice versa.

The method may include using the calibration module to poll the indicating devices by transmitting a polling signal through the loop. The polling signal may be a modulation of the voltage in the loop, and may be an increase or decrease in voltage, and/or a voltage pulse. The method may include using the fire panel to modulate the voltage in the loop differently for each signal it sends out; for example, the modulation in the voltage caused by polling signals may differ from that caused by signals indicating an alarm condition. The method may include encoding the polling signal with an address of an indicating device, which may include using this encoding to communicate which indicating device the polling signal is intended for. The method may include using a transceiver in the indicating devices to decode signals received from the fire panel. Therefore, the method may include using the transceiver of an indicating device to decode the address of any polling signals it receives and determine whether it is the indicating device that the polling signal is intended for.

If an indicating device determines that it is the device the polling signal is intended for, then the method may include using the indicating device to modulate a current in the loop. This modulation in the current may be equivalent to that transmitted by the indicating device when it detects a condition indicative of a possible emergency. The method may include using the fire panel to detect this modulation in the current and using the calibration module and/or loop controller to determine its amplitude. The method may include using the loop card to detect the modulation in the current and communicate the modulation in the current to the loop controller and/or calibration module. Alternatively, the method may include using the loop controller and/or calibration module to detect the modulation in current directly. The method may include using the loop controller and/or the calibration module to determine the amplitude of the modulation in the current. The method may include using the loop controller and/or the calibration module to determine the current response value based on the amplitude of the modulation in the current. The method may therefore include using the calibration module to directly determine the current response value, or using the loop controller to determine the current response value communicate it to the calibration module. The method may include using the calibration module to store the current response value. For example the method may include storing the current response value in the memory device as discussed above. The method may include only storing the current response values during the calibration mode of operation. The method may then include repeating this process for each indicating device in the loop, until the current response value of every indicating device is measured and, if in the calibration mode, stored.

The method may include using the indicating devices to modulate the current in both directions through the loop. During normal operation of the fire system, the indicating devices may be modulate the current in a first direction through the loop, and the fire panel transmit signals to the remote units through a second direction through the loop, wherein the second direction may be opposite to the first direction. The fire panel may also supply power to the remote units through the second direction in the loop during normal operation. However, if a break in the loop occurs, the direction in which the remote units and fire panel communicate, and the direction in which the fire panel supplies power to the loop, may change based on where the break in the loop is located. For example, any remote devices forward of the break (i.e. located along the first direction from the break) may continue modulating the current in the first direction in the loop, and may continue receiving power and/or communications from the fire panel along the second direction in the loop. However, any remote devices behind the break (i.e. located along the second direction from the break) may start modulating the current in the second direction along the loop, and may begin receiving power and/or communications from the fire panel along the first direction along the loop. That is, the method may include using the fire panel to transmit power and/or communications along the first direction in the loop to any remote devices located behind the break, and to transmit power and/or communications along the second direction in the loop to any remote devices located ahead of the break. When a break occurs, the remote units located behind the break will be unable to receive or send communications to the fire panel through their usual direction of communication. The method may therefore include determining the location of the break by the fire panel detecting that it is not receiving responses from certain remote units in the loop. In response, the method may include reversing the direction in which the fire panel communicates and/or supplies power to the remote units located behind the break, and also using the fire panel to command the indicating devices located behind the break to reverse the direction in which they modulate the current. Alternatively, the method may include using the indicating devices located behind the break to reverse the direction in which they modulate the current themselves without any instruction from the fire panel, as they may detect that they have stopped receiving power and/or communications from the fire panel and, in response, determine that they are behind a break and thus must reverse their communication direction. In this case, the method may include determining the location of the break based on the direction of communication from each indicating device to the fire panel.

In view of the above, it may be advantageous to measure and store the current response values of each indicating device in both directions along the loop. Therefore, in the maintenance and/or calibration mode, the method may include using the indicating devices modulate the current in the first direction along the loop and/or in the second direction along the loop when responding to polling signals. The method may include using the calibration module to transmit a first polling signal that requests the current response value of an indicating device in the first direction, and a second polling signal that requests the current response value of an indicating device in the second direction. Alternatively, the method may include using the calibration module to transmit a single polling signal that requests the current response values of an indicating device in both directions. In response to this polling signal, the method may include using the indicating device to first modulate the current along the first direction, and then modulate the current along the second direction, or vice versa. Alternatively, the method may include using the indicating device to modulate the current along the loop in both directions simultaneously. The current response value of an indicating device in the first direction may be known as its first current response value, and the current response value of an indicating device in the second direction may be known as its second current response value. In the calibration mode, the method may include using the calibration module may be configured to store both the first and second current response values of each indicating device, for example at a memory device as described above.

The method may include using the calibration module to compare each current response value to the current threshold value, and to indicate a warning if a current response value is within a predetermined margin from the current threshold value. The method may include using the calibration module to label any current response values that are within a predetermined margin from the current threshold value as warning values. The method may include indicating the warning as a warning notification and communicating the warning notification through a form of visual feedback, such as LED lights and/or the fire panel display. Additionally or alternatively, the method may include using one or more transmitter devices in the fire panel to communicate the warning to users, for example via wireless transmission of the warning notification to a mobile device. The warning notification may include information regarding the indicating device that caused the warning value, such as its address and location. The method may include using the fire panel to communicate the warning to the indicating device responsible for the warning value, and cause the indicating device to enter a warning condition. The indicating device may comprise an indicator, such as a visual and/or audible indicator, and the method may include using the indicator to communicate a warning condition to a user. The method may include indicating warnings in the maintenance mode and/or the calibration mode.

The method may include using the calibration module to produce a maintenance report each time the fire system enters the maintenance mode. The maintenance report may contain information such as the stored current response values of each indicating device, the measured current response values of each indicating device, a difference between the measured and the stored current response values of each indicating device, and which of the measured current response values have been identified as warning values. The method may include communicating the maintenance report from the calibration module to the loop controller, and then from the loop controller to a transmitter device of the fire panel. Alternatively, the method may include communicating the maintenance report from calibration module to the transmitter device directly. The method may include using the transmitter device to transmit the maintenance report to a user, for example via wireless transmission of the maintenance report to a mobile device. Additionally or alternatively, the method may include displaying the maintenance report on the fire panel display.

Through the warning and/or the maintenance report, users may be able to identify when the performance of an indicating device and/or the performance of the overall loop has degraded to the point where it may cause faults in the fire system. If the current response value of an indicating device falls below the current threshold value, then it will no longer be able to communicate an alarm condition to the fire panel when it detects conditions that are indicative of a possible emergency. In order to properly identify and rectify faults, it is therefore important for a user to be able to identify which current response values of the indicating devices are approaching, or have passed, this current threshold value. By measuring the current response values of the indicating devices and producing a maintenance report each time the fire system enters the maintenance mode, any faults across the loop may be easily identified. Further, any degradations in performance over time due to aging may be observed and remedied by a user prior to a fault occurring.

A user may be able to determine what kind of fault has occurred, or is about to occur, based on the warning and/or maintenance report. For example, if a user identifies only a single fault across the loop in an aged indicating device, then they may be able to determine that the fault has been caused solely by the aging of that device. Alternatively, if a user identifies faults in all the indicating devices, it may be indicative of a problem across the whole loop.

Thus, after the fire system has entered the maintenance mode and a maintenance report has been produced, a user may determine, based on the maintenance report, that the fire system should enter a calibration mode, wherein updated current response values are stored and/or a new current threshold value is set. The method may include entering the fire system into the calibration mode in response to an input by a user, for example through a button and/or an option presented on the fire panel display.

The method may include using the calibration module to adjust the current threshold value based on the current response values. The method may include adjusting the current threshold value if instructed to by a user, for example in reaction to triggering of the calibration mode. As mentioned above, the user may determine from the maintenance report and/or any warnings indicated by the fire panel during the maintenance mode that the current threshold value should be adjusted. For example, the user may determine that the current threshold value should be adjusted in response to observing that at least one current response value is within a predetermined margin from the previous current threshold value, and/or in response to observing that at least one current response value is labelled as a warning value. Upon this determination, the user may trigger the calibration mode in the fire system, and the method may include triggering the adjustment of the current threshold value in response to this. The method may include using the calibration module to determine a new current threshold value based on the smallest current response value. The method may include determining the new current threshold value to be equal to the lowest current response value plus or minus a predetermined error threshold. Thus, the method may include adjusting the current threshold value to account for any degradations in performance in the indicating devices or fire system.

The fire system may comprise a plurality of isolators for dividing the loop into multiple, electrically isolatable segments. The method may include placing an isolator between each remote unit. Additionally or alternatively, the method may include embedding isolators within some or all of the remote units. Thus, the method may include using the plurality of isolators to electrically isolate at least some of the remote units from the rest of the circuit. The method may also include using the plurality of isolators to isolate any short-circuits in the loop. The method may include indicating that an isolator has been activated through an indicator, such as an LED, that the isolator comprises.

In the maintenance mode and/or the calibration mode of operation, the method may include activating at least some of the plurality of isolators in response to actions from an operator. Alternatively, the method may include automatically activating the isolators in response the fire system entering the maintenance mode and/or the calibration mode, for example by the loop controller and/or the calibration module. The method may include activating the isolators in such a way that a single indicating device is left electrically connected to the fire panel in the loop, with all the remaining remote units electrically isolated from the fire panel. The method may include using the loop controller and/or the calibration module to determine which isolators should be activated. Thus, noise from the remote units may be reduced in the calibration mode when isolators are employed.

However, during normal operation of the fire system, the isolators are not employed and all of the remote units are electrically connected to the fire panel. Therefore, the current response value of each indicating device will be impacted by the number of remote units ahead of said indicating device, i.e. the number of remote units located between said indicating device and the fire panel in the direction of travel of the modulation in current. Hence, when isolators are employed, the method may include using the calibration module to subtract the current consumption of each remote unit ahead of an indicating device from the detected modulation in current transmitted by that device in order to determine its current response value. The method may include storing the current consumption of each remote unit at the fire panel, such as in the loop card. The current consumptions may be known from the specifications of the remote units.

The method may include initially carrying out calibration of the fire system when the fire system is first installed. That is, the method may include placing the fire system in the calibration mode of operation when it is first installed, and determining and storing the current threshold value and individual current response values of the indicating devices based on this initial calibration. The method may then include placing the fire system in the maintenance mode periodically afterwards, and/or when changes are made to the fire system. Based on the results of the maintenance mode, the method may include placing the fire system in the calibration mode again in response to a user input, as described above.

The method may include using the current response values to determine which indicating device a detected modulation in current has originated from. Additionally or alternatively, the method may include using the current response values to determine if a detected modulation in current has originated from multiple indicating devices, or from a single indicating device transmitting multiple responses. This may be possible due to at least some of the indicating devices having different current response values. Thus, the current response value of an indicating device may be characteristic of that particular indicating device, and may be used for identification purposes.

The method may include using the indicating devices for sensing conditions or for receiving inputs from users. For example the indicating device may include one or more of: manual call points; smoke detectors; heat detectors; other building sensors used for fire or heat detection, such as room thermostats; sensors for supervised doors; sensors for supervised fire extinguishers; water flow sensors; and so on. The method may include using input-output modules for handling information from some types of sensors that may lie outside of the fire system, such as thermostats or water flow sensors. Additionally or alternatively, the method may include using input-output modules for activating fire extinguishers, fire sprinklers, automatic door opening and/or closure systems, or door locking systems. The indicating device may provide inputs for triggering an alarm condition of the fire system.

The method may include using at least one indicator device for indicating an alarm condition of the fire system, such as through audible or visible devices. The indicator device may include one or more of: sirens; bells; speech sounders; other types of sounders; lights; beacons or remote indicators. The method may include using one or more transmitter devices in an indicator device for sending alarm notifications to users. The method may include sending alarm notifications to local users, for example via wireless transmission of notifications to a mobile device, and/or sending alarm notifications to remote users such as building management authorities and/or emergency services.

The method may include using at least one combined indicating and indicator device, for example a device including detection capabilities along with an alarm, such as smoke detectors also including an audible alarm. Such a device may include combinations of any of the functions discussed above in relation to the indicating and indicator devices.

BRIEF DESCRIPTION OF THE DRAWINGS

Certain embodiments of the disclosure will now be described by way of example only and with reference to the accompanying drawings in which.

DETAILED DESCRIPTION OF THE INVENTION

Figure 1:
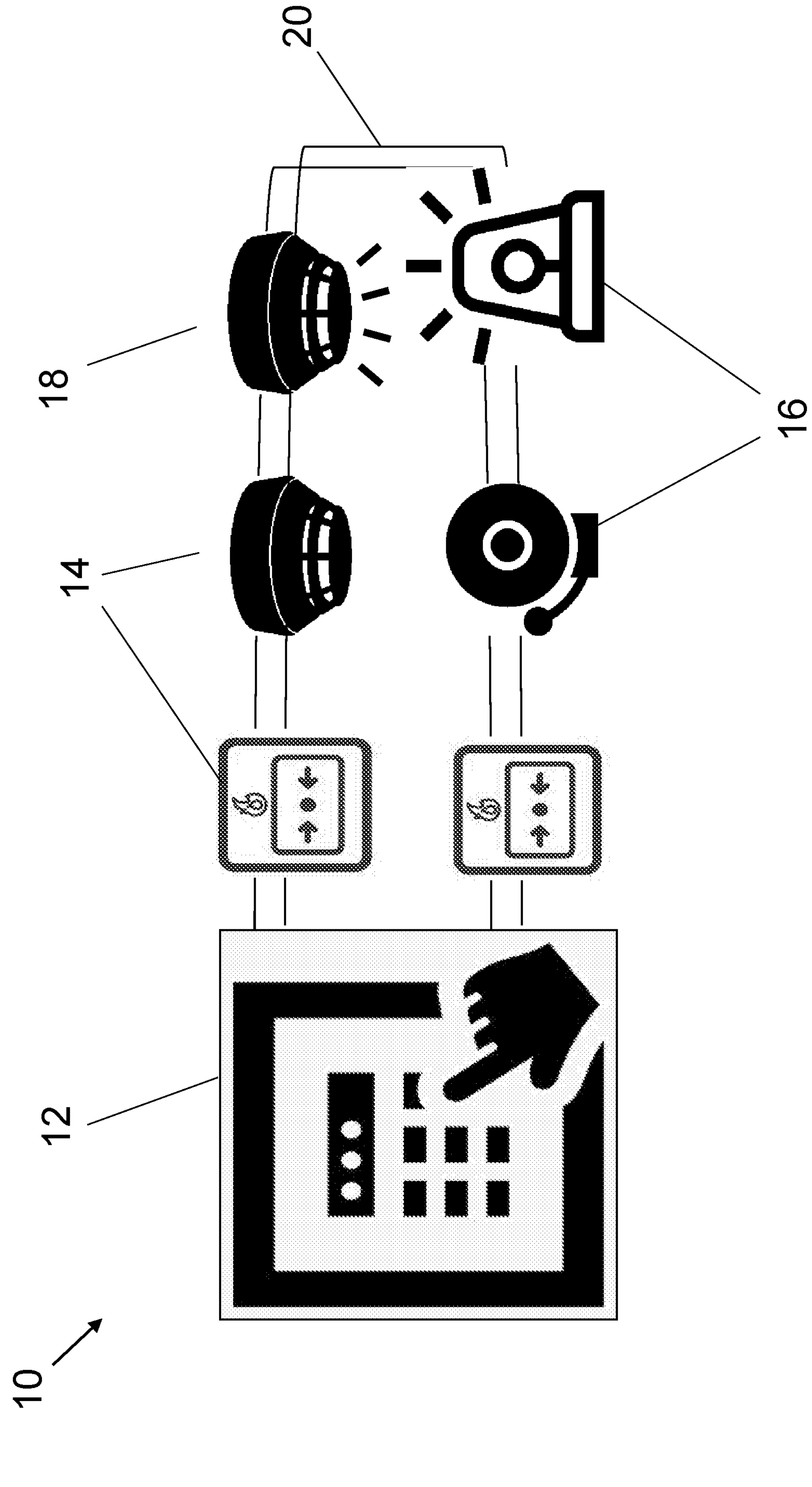
FIG. 1 is a diagram of a fire system using a master-slave communication system.

As shown in FIG. 1, a fire system 10 comprises a fire panel 12 and a number of remote units 14, 16, 18. The fire system 10 and remote units 14, 16, 18 are electrically connected in a loop configuration, joined by wire 20, with each remote unit positioned at a different location along the loop. This fire panel 12 may be used to additionally provide power to the remote units 14, 16, 18. Alternatively, the remote units 14, 16, 18 may be powered independently of the fire panel 12. The remote units of FIG. 1 comprise indicating devices 14, indicator devices 16, and combined indicating and indicator device 18. Indicating devices 14 are used to detect conditions indicative of an emergency, and may include manual call points, smoke detectors, and/or heat detectors. Indicator devices 16 are used to alert users of an emergency condition and may include audible or visual devices, such as lights and/or bells. The combined indicating and indicator device 18 has a detection capability alongside an alarm, and may comprise a fire and/or smoke alarm. Although not shown in FIG. 1, the fire system may further comprise fire suppression devices.

The remote units 14, 16, 18 communicate with the fire panel 12 in a master-slave relationship. The remote units 14, 16, 18 send signals to the fire panel 12 through the wire 20 in the form of modulations in the current. These signals inform the fire panel 12 of the status of the remote units 14, 16, 18. The modulations in the current created by the remote units 14, 16, 18 may be increases or decreases in current. In response, the fire panel 12 may issue a command to the remote units 14, 16, 18. For example, if indicating device 14 modulates the current in such a way that is indicative of a possible emergency, the fire panel 12 may send a command to the remaining remote units 14, 16, 18 instructing them to enter an alarm condition. Alternatively, the fire panel 12 may send this command to only some of the remote units 14, 16, 18, depending on the location and nature of the possible emergency. The command may be in the form of a modulation of the voltage.

The fire panel 12 may also periodically send polling signals to the remote units 14, 16, 18, and the remote units 14, 16, 18 may respond with information regarding their status, their address, and/or their manufacturer code. The fire panel 12 may comprise means for alerting a user of a possible emergency. These means can include, but are not limited to, lights and/or a display.

The fire panel 12 may determine a current response value from any detected modulations in current caused by the remote units 14, 16, 18. The current response value is based on the amplitude of the current when modulated by a remote device, as detected by the fire panel 12. The fire panel 12 may compare this current response value to a current threshold value in order to determine whether the modulation in current is indicative of a possible emergency. For example, the current response value may be considered to indicate a possible emergency if it exceeds the current threshold value. Alternatively, the current response value may be considered to indicate a possible emergency if it falls below the current threshold value.

Figure 2:
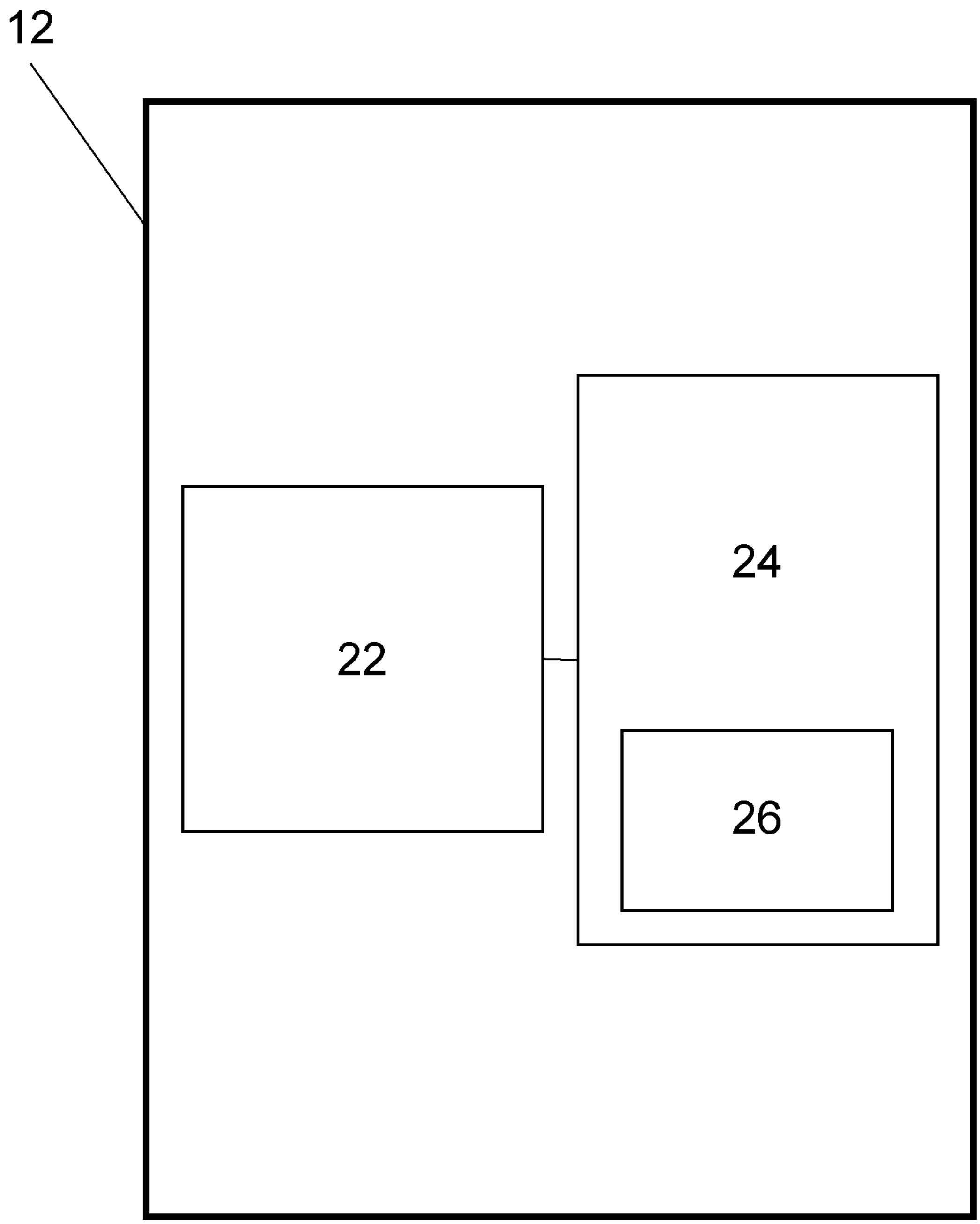
FIG. 2 is a diagram of a fire panel comprising a calibration module.

The fire panel 12 is shown in FIG. 2. The fire panel 12 comprises a calibration module 22 for carrying out and controlling the calibration of the fire system 10. As shown in FIG. 2, the fire panel 12 may also comprise a memory device 26. The memory device 26 may store the current response values. A user may be able to view these current response values through a fire panel display, if desired. The memory device 26 may be part of a loop card 24. The loop card 24 may receive information from the remote devices 14, 16, 18 and communicate that information to the calibration module 22, and/or to a loop controller (not shown). Similarly, the loop card 24 may receive signals from the calibration module 22 and/or loop controller and communicate those signals to the remote devices 14, 16, 18. The loop card 24 may therefore electrically connect the calibration module 22 to the loop. The loop card may comprise LED lights for indicating a basic condition of the fire system, such as an alarm condition or a fault condition.

The operation of the fire panel 12 may be controlled by a loop controller, which may be a central processing unit (CPU). The loop controller may process the information received from the remote units 14, 16, 18 and decide how to respond. For example, the loop controller may decide whether it is necessary to communicate an alarm condition to some or all of the remaining remote units 14, 16, 18, or may cause the remote units 14, 16, 18 to enter an alarm condition at different times in order to aid and manage evacuation of a building. The calibration module 22 may be part of the loop controller, or may work alongside the loop controller in order to carry out maintenance and/or calibration of the fire system 10.

The fire panel 12 may trigger a maintenance mode of operation in the fire system 10. The maintenance mode may be a mode in which the current response values of each indicating device 14, 18 are measured, and a maintenance report is produced and communicated to a user, the maintenance report including information based on the measured current response values. The fire system 10 may be placed in the maintenance mode automatically, and the maintenance mode may be triggered by the calibration module 22 and/or loop controller. The maintenance mode may be triggered in response to a change in the fire system 10 being detected by the fire panel 12, such as the addition, removal, or replacement of a remote unit 14, 16, 18, or a change due to a maintenance repair. The maintenance mode may be triggered periodically, for example weekly, monthly, or daily. This may be done automatically or in response to an input from an operator.

In addition to the above, or as an alternative, the fire panel 12 may trigger a calibration mode of operation in the fire system. In the calibration mode of operation, the current response values may be both measured and stored, for example in the loop card 24. The calibration mode may also include re-calibration of the current threshold value, as will be explained in further detail below.

The fire panel 12 may trigger the maintenance mode and/or the calibration mode in response to a command from an operator. The maintenance mode and/or calibration mode may be triggered by pressing a button on the fire panel 12, or an option on the fire panel display. The fire panel 12 may comprise means for wirelessly communicating with a mobile device, for example via a Wi-Fi network. Therefore, an operator may be able to trigger the maintenance mode and/or calibration mode remotely through a mobile device. The calibration mode may be triggered by an operator based on the maintenance report. For example, the operator may trigger the calibration mode when the maintenance report indicates that the currently stored current response values are no longer accurate, and/or if the maintenance report has led to maintenance work being done to the fire system 10.

The calibration mode may be triggered when the fire system 10 is first installed, either automatically or by an operator. This initial calibration may be used to determine the current threshold value of the fire system 10, and to store initial current threshold values of each indicating device 14, 16.

The calibration module 22 is configured to poll each indicating device 14, 18 for its current response value. The calibration module 22 may therefore transmit a polling signal through the loop. The polling signal may be encoded with an address of the indicating device 14, 18 it is intended for, and the indicating devices 14, 18 may comprise a transceiver for decoding the polling signal. If an indicating device 14, 18 determines that it is the indicating device 14, 18 that the polling signal is intended for, it may respond by modulating a current in the loop. This modulation in the current may be equivalent to that transmitted by the indicating device 14, 18 when it detects conditions indicative of an emergency.

The fire panel 12 may detect this modulation in the current in the loop through its loop card 24. The loop card 24 may then communicate this information to the calibration module 22. The calibration module 22 may determine the amplitude of the modulation in current, and may determine the current response value based on that amplitude. The calibration module 22 may work together with the loop controller to do this. Alternatively, the loop controller may determine the amplitude of the modulation in current and the current response value itself, and may communicate this information to the calibration module 22. The calibration module 22 may then, if in the calibration mode, store the current response values, for example in the memory device 26.

This process may be repeated for each indicating device 14, 18 in the loop until the current response value of every indicating device is measured and, if in the calibration mode, stored. The indicating devices 14, 18 may be polled sequentially. For example, the indicating device located closest to the fire panel 12 in the loop may be polled first, and the indicating device located furthest from the fire panel 12 in the loop may be polled last, or vice versa.

Figure 3:
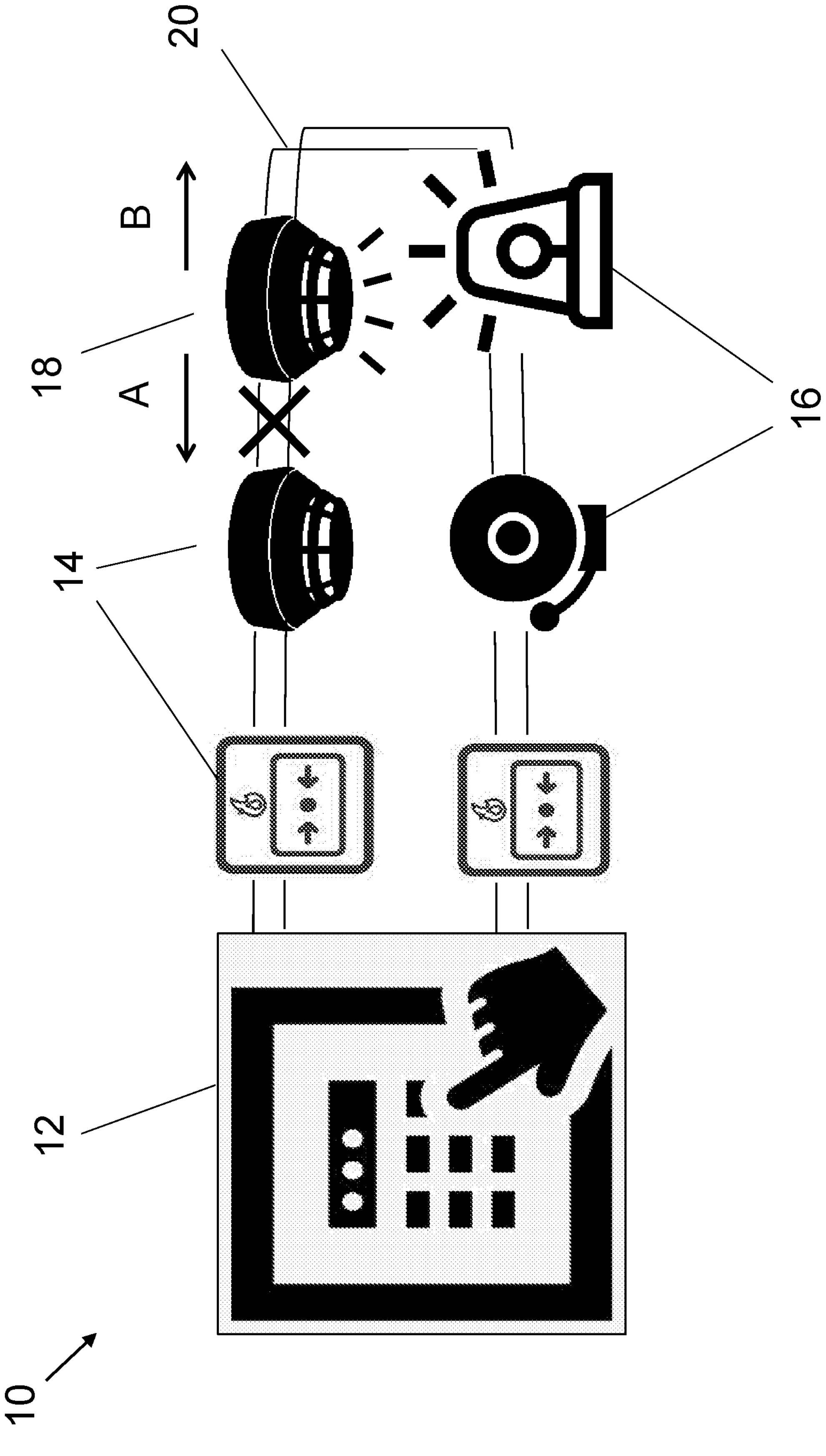
FIG. 3 is a diagram of a fire system with a circuit break.

FIG. 3 shows the fire system 10 with a circuit break in the loop, shown by the cross between indicating device 14 and indicating device 18. Typically, the indicating devices 14, 18 may modulate the current in the loop in a first direction A and the fire panel 12 may supply both power and communications to the remote units 14, 16, 18 in a second direction B which is opposite to the first direction A. It will be appreciated that, although direction A is shown to be clockwise in FIG. 3 and direction B is shown to be anticlockwise, the inverse is possible and depends on the fire system 10 being used. In FIG. 3, the circuit break is preventing all devices located behind the break (i.e. along the second direction B from the break) from receiving power and/or communications in the second direction B, as well as preventing any indicating devices 14, 18 behind the break from communicating with the fire panel 12 in the first direction A. When the fire panel 12 and/or remote units 14, 16, 18 detect this situation, the direction of communications and/or power will be reversed for the remote units behind the circuit break. That is, the remote units 14, 16, 18 located behind the break will begin modulating the current in the second direction B instead, whilst the fire panel 12 will start supplying power and/or communications to these remote units through the first direction A.

The current response values of the indicating devices 14, 18 may depend based on how far the modulation in current has had to travel before it reaches the fire panel 12. Hence, if the direction in which the current is modulated is reversed, this may affect the current response values of the indicating devices 14, 18. In view of this, the calibration module 22 may be configured to poll the indicating devices 14, 18 for their current response values in both directions through the loop 20. That is, the polling signals in the maintenance and/or calibration mode may request the indicating devices 14, 18 to modulate the current in both the first direction A and the second direction B. The polling signals transmitted by the calibration module 22 may include a first polling signal requesting a first current response value in the first direction and a second polling signal requesting a second current response value in the second direction. Alternatively, the polling signals may include a single polling signal for each indicating device 14, 18 requesting the first and second current response values at the same time. The indicating devices 14, 18 may respond by modulating the current in each direction sequentially or simultaneously. In the calibration module, the calibration module 22 may store both the first and second current response values of the indicating devices 14, 18 in the loop card 24.

The calibration module 22 may compare each current response value to the current threshold value. If a current response value is within a predetermined margin from the current threshold value, the calibration module 22 may label it as a warning value and indicate a warning. This may occur in both the calibration mode and the maintenance mode of operation. The calibration module 22 may indicate the warning visually, for example through LED lights. The calibration module 22 may issue a warning notification, which may be displayed on the fire panel display or transmitted wirelessly to a mobile device. The warning notification may inform a user of which indicating device caused the warning value, and where it is located. As such, the fire system 10 can monitor the performance of the indicating devices 14, 18 through the calibration mode, and can notify an operator when the performance of an indicating device 14, 18 has degraded to the point where it might not be able to communicate a fire alarm condition. Hence, potential faults in the fire system 10 can be identified and rectified before any failure actually occurs. For example, any indicating devices 14, 18 responsible for warning values may be replaced in the fire system 10 in order to prevent any faults occurring.

As mentioned above, the calibration module 22 may be configured to produce a maintenance report in the maintenance mode of operation. This maintenance report may contain information such as the stored current response values of the indicating devices 14, 18, the measured current response values of the indicating devices 14, 18, a difference between the stored and measured current response values, and an indication of which current response values are labelled as warning values. The maintenance report may be communicated to an operator through the fire panel display, or may be transmitted to a mobile device of an operator through a transmitter device of the fire panel 12. An operator may then decide to trigger the calibration mode in the fire system 10 based on the maintenance report.

The calibration module 22 may be configured to set a new current threshold value based on the current response values. The calibration module 22 may only set a new current threshold value if instructed to by an operator, for example through the triggering of the calibration mode. An operator may decide to set a new current threshold value based on the maintenance report produced during the maintenance mode. For example, an operator may see one or more current response values are labelled as warning values and thus are dangerously close to the current threshold value. The calibration module 22 may set the current threshold value to be equal to the lowest current response value plus or minus a predetermined error margin. Consequently, a dynamic current threshold value may be established that is adaptable to changes in the fire system 10. The calibration module 22 may communicate this new current threshold value to an operator, for example by communicating the new current threshold value to a transmitter device such that it can be transmitted to the operator or by displaying the new current threshold device on the fire panel display. Therefore, if the new current threshold value is set too low, such that it may result in a number of false positives, an operator may be able to see this and recalibrate the fire system 10 accordingly. Alternatively, the calibration module 22 may itself determine that a new current threshold value would be too low and hence would risk improper operation of the fire system 10. In this case, the calibration module 22 may retain the previous current threshold value, and indicate a warning instead.

Figure 4:
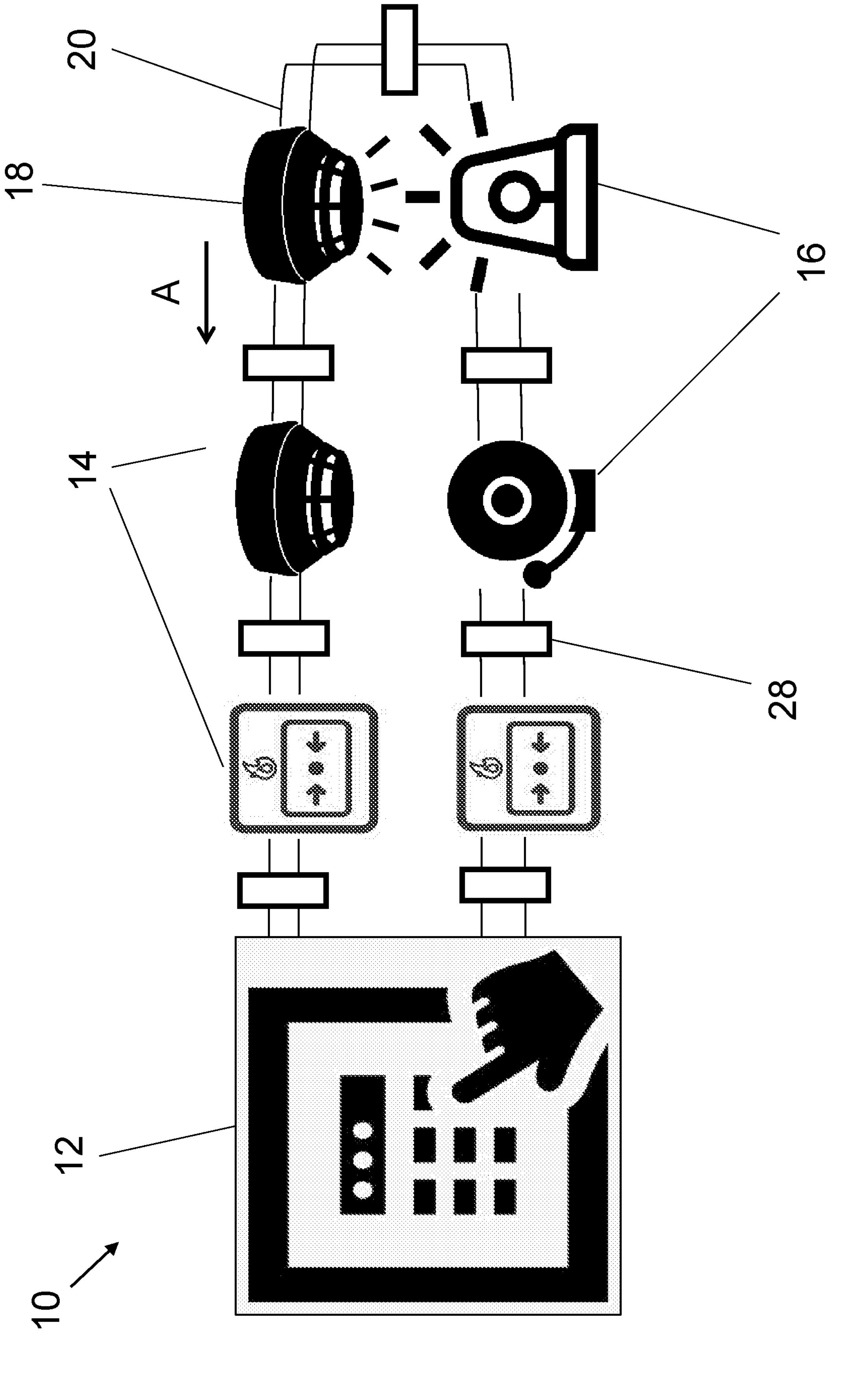
FIG. 4 is a diagram of a fire system with isolators operating in a calibration mode.

FIG. 4 shows fire system 10 comprising a plurality of isolators 28. In FIG. 4, an isolator 28 is positioned between each remote unit 14, 16, 18. However, it will be appreciated that the isolators 28 may be embedded in the remote units 14, 16, 18 instead, or in addition to the isolators 28 located on the loop. The isolators 28 allow selected remote units 14, 16, 18 to be electrically isolated from the rest of the loop. At least some of the isolators 28 may be activated in the maintenance mode and/or the calibration mode in order to electrically isolate at least some of the remote units 14, 16, 18 from the loop. Different isolators 28 may be activated at different times depending on which indicating device 16, 18 is being polled. The calibration unit 22 and/or the loop controller may automatically control the operation of the isolators, or an operator may manually control the operation of the isolators.

For example, the calibration module 22 may activate the isolators 28 such that only remote unit 18 is electrically connected to the fire panel 12, with the other remote units 14, 16 being electrically isolated from the loop by the isolators 28. As such, noise in the loop may be reduced when determining the current response value of the remote unit 18.

However, during normal operation of the fire system 10, the remote units 14, 16, 18 are all electrically connected to the fire panel 12. Therefore, any modulations in current travelling through the loop will be affected by the remote units 14, 16, 18 it passes by. It is therefore important for the fire panel 12 to take account of this when using isolators 28 in the maintenance mode and/or the calibration mode. Hence, when isolators 28 are utilised in the maintenance mode and/or calibration mode, the current consumption of any remote devices 14, 16, 18 that the modulation in current passes will be taken into account when determining the current response values.

As shown in FIG. 4, the remote unit 18 modulates the current in a direction A along the loop. When the fire panel 12 is determining the current response value of this remote unit, it may therefore factor in the current consumption of all the remote units located along the loop in the direction A from the remote unit 18.

The current response values may be used during normal operation of the fire system 10 in order to distinguish between responses from the indicating devices 14, 18. For example, the current response values may be considered to be characteristic of each indicating device 14, 18 if each indicating device 14, 18 has a different current response value. As such, the fire panel 12 may be able to determine which indicating device 14, 18 a modulation in current has originated from based on the current response value of the modulation in current. Further, the fire panel 12 may be able to determine if a detected modulation is a result of multiple responses from a single indicating device or multiple responses from different indicating devices through the current response values. For example, if a first indicating device has a current response value of 20 mA and a second indicating device has a current response value of 25 mA, then a current modulation with a value of 45 mA may be determined to have come from both the first and second indicating devices. Alternatively, a current modulation with a value of 40 mA may be determined to be a result of multiple responses from the first device.

As mentioned above, the remote units 14, 16, 18 may comprise indicating devices 14, indicator devices 16, or combined indicator and indicating devices 18. These can include manual call points; smoke detectors; heat detectors; other building sensors used for fire or heat detection, such as room thermostats; sensors for supervised doors; sensors for supervised fire extinguishers; water flow sensors; sirens; bells; lights; transmitter devices and so on. The fire system 10 may include input-output modules for handling information from some types of indicating devices 14 that may lie outside of the fire system 10, such as thermostats or water flow sensors. Additionally or alternatively, input-output modules may be provided for activating automatic door opening and/or closure systems, or door locking systems.

The calibration module 22 therefore allows the condition of the fire system 10 to be monitored. By measuring the current response values of each indicating device 16, 18, the performance of the fire system 10 can be observed and the fire system 10 can be adapted accordingly. This may be achieved by establishing an appropriate current threshold value for the specific fire system 10 being used, and/or identifying and remedying any degradations in performance before a fault occurs. A fire system 10 with improved reliability and safety is therefore provided by the use of such a calibration module 22.

What is claimed is:

1. A fire system for a building, the fire system comprising:

a fire panel for monitoring the building and activating an alarm; and a plurality of remote units electrically connected to the fire panel in a circuit having a loop configuration, at least some of the plurality of remote units comprising an indicating device for modulating a current in the circuit;

wherein the plurality of remote units are in communication with the fire panel in a master-slave relationship;

wherein the fire panel comprises a calibration module for polling each indicating device to obtain a current response value and for storing said current response values, the current response value of an indicating device being based on the amplitude of the current when modulated by that indicating device; and the calibration module is configured to adjust a current threshold value based on an input from a user and the current response values, the current threshold value being the current response value at which the fire panel triggers an alarm, and the adjusted current threshold value being determined to be equal to the lowest current response value plus or minus a predetermined error threshold.

2. The fire system as claimed in claim 1, wherein the fire panel comprises a memory device for storing the current response values.

3. The fire system as claimed in claim 2, wherein the fire panel comprises a loop card, and the loop card comprises the memory device.

4. The fire system as claimed in claim 1, wherein the fire panel is configured to trigger a maintenance mode of operation for measuring the current response value of each indicating device and/or a calibration mode of operation for measuring and storing the current response value of each indicating device in the fire system.

5. The fire system as claimed in claim 4, wherein the maintenance mode is automatically triggered in response to changes to the fire system and/or in response to passage of a time period.

6. The fire system as claimed in claim 4, wherein the maintenance mode and/or the calibration mode is triggered in response to an input from an operator.

7. The fire system as claimed in claim 4, wherein the maintenance mode is triggered as part of a maintenance routine.

8. The fire system as claimed in claim 4, wherein the calibration module is configured to produce a maintenance report in the maintenance mode.

9. The fire system as claimed in claim 1, wherein the calibration module is configured to poll the indicating devices by transmitting a polling signal through the loop.

10. The fire system as claimed in claim 9, wherein the polling signal is a modulation of a voltage in the loop, and/or wherein the indicating devices are configured to respond to the polling signal by modulating the current in the loop.

11. The fire system as claimed in claim 1, wherein the calibration module is configured to indicate a warning if a current response value is within a predetermined margin from a current threshold value, the current threshold value being the current response value at which the fire panel triggers an alarm.

12. The fire system as claimed in claim 1 comprising a plurality of isolators for electrically isolating at least some of the remote units from the rest of the loop during calibration.

13. The fire system as claimed in claim 1, wherein the fire panel is configured to determine which indicating device a detected modulation in current has originated from based on the current response values.

14. A method of operating a fire system as claimed in claim 1, wherein the method comprises polling each indicating device for its current response value, and then reporting said current response values to a user and/or storing said current response values.

15. The fire system as claimed in claim 4, wherein the calibration module is configured to trigger the maintenance mode and/or calibration mode.

* * * * *